United States Patent [19]

Hunger et al.

[11] Patent Number: 4,589,921
[45] Date of Patent: May 20, 1986

[54] PROCESS FOR IMPROVING THE APPLICATION PROPERTIES OF PIGMENT YELLOW 13

[75] Inventors: Klaus Hunger, Kelkheim; Wolfgang Rieper, Frankfurt am Main, both of Fed. Rep. of Germany

[73] Assignee: Hoechst Aktiengesellschaft, Frankfurt, Fed. Rep. of Germany

[21] Appl. No.: 743,270

[22] Filed: Jun. 10, 1985

Related U.S. Application Data

[63] Continuation of Ser. No. 614,718, May 29, 1984, abandoned, which is a continuation of Ser. No. 398,117, Jul. 14, 1982, abandoned.

[30] Foreign Application Priority Data

Jul. 16, 1981 [DE] Fed. Rep. of Germany ....... 3128057

[51] Int. Cl.$^4$ .................... C09B 62/01; C09B 67/00; C09D 11/02
[52] U.S. Cl. ................ 106/288 Q; 106/23; 534/747; 534/887
[58] Field of Search ............ 106/288 Q, 23; 534/747, 534/887

[56] References Cited

U.S. PATENT DOCUMENTS 4,469,515  9/1984  Pechey et al. ..................... 106/23

Primary Examiner—Helen M. McCarthy
Attorney, Agent, or Firm—Curtis, Morris & Safford

[57] ABSTRACT

The invention relates to a process for improving the application properties of Pigment Yellow 13. The crude pigment is heated in an aqueous suspension to temperatures above 100° C. Pigment Yellow 13 thus obtained is particularly suitable for replacing lead-containing chrome yellow pigments of comparable shade.

8 Claims, No Drawings

PROCESS FOR IMPROVING THE APPLICATION PROPERTIES OF PIGMENT YELLOW 13

This application is a continuation of application Ser. No. 614,718, filed May 29, 1984, which is a continuation of Ser. No. 398,117, filed July 14, 1982, both abandoned.

Within the framework of efforts to replace inorganic lead-containing pigments, such as those in the chrome yellow ranges, by lead-free products, E. Schoohf (Industrie- und Automobillacke mit und ohne bleihaltige Pigmente [Industrial and automobile paints with and without lead-containing pigments], Handbook pages 501–506, XIth FATIPEC Congress, Florence, 11th–16th June 1972, Milan 1972) proposed using, in the paint sector and in the yellow region, combinations of organic yellow pigments of the tetrachloroisoindolinone series with nickel titanium yellow and iron oxide yellow. As regards the application in printing inks, U.S. Pat. No. 4,204,871 advises preparing azo pigments by mixed coupling in the presence of highly dispersed inorganic materials such as iron oxide, titanium dioxide, barium sulfate, aluminum hydroxide, clays or mixtures thereof to bring about an intimate bond between the inorganic material and the organic pigment mixture.

The preparation of two high-hiding pure organic yellow pigments, namely C.I. Pigments Yellow 16 and 83, is already known (U.S. Pat. Nos. 4,048,152 and 3,974,136). In this preparation method, the products obtained after coupling are heated in a mixture of water and an organic solvent which is not, or only partially, miscible with water to temperatures above 100° C.

It has now been found that the application properties of the disazo pigment C.I. Pigment Yellow 13, C.I. 21100, of the formula

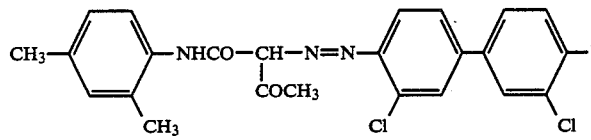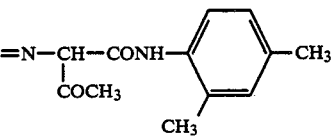

in particular the viscosity and hiding power when used in printing inks, can be improved in a simple process to such an extent that this pigment can be used to replace lead-containing chrome yellow pigments of comparable shade.

The invention therefore relates to a process for improving the application properties of Pigment Yellow 13, which process comprises heating the crude pigment in an aqueous suspension to temperatures above 100° C.

For this process, an isolated and, if necessary, washed crude pigment can be dispersed in water, if desired with the addition of a surfactant, but preferably the coupling suspension obtained after the reaction of bis-diazotized 3,3'-dichlorobenzidine with finely divided 1-acetoacetylamino-2,4-dimethylbenzene, optionally in the presence of a surfactant, is used for the aftertreatment according to the invention.

The pigment concentration of the suspension is advantageously 1 to 10, preferably 2 to 8, % by weight.

The thermal aftertreatment is carried out with thorough mixing advantageously directly in the reaction vessel in which the azo coupling was carried out.

The duration of the thermal aftertreatment depends on the temperature, which, in turn, is dependent on the pressure. Since elevated operating pressures require correspondingly expensive pressure vessels, the suspension is advantageously heated with thorough stirring to about 120° to 150° C. This treatment takes about half an hour to 5 hours.

The treatment according to the invention leads to a pigment which, in viscosity behavior, in hiding power and in gloss, is surprisingly comparable with a product after-treated in an aqueous-organic medium in accordance with U.S. Pat. Nos. 4,048,152 and 3,974,136. However, by comparison, the process according to the invention is distinguished by particular simplicity, since no organic solvent has to be used and regenerated.

In the example which follows parts and percentages are by weight:

A bis-diazonium salt solution containing sulfuric acid and obtained from 25.3 parts of 3,3'-dichlorobenzidine was allowed, at 20° to 25° C., to flow into a finely divided acetate-buffered slurry of 42.1 parts of 1-acetoacetyl-amino-2,4-dimethylbenzene in 600 parts of water. After the reaction was complete, the pigment suspension was heated to 125° C. in a stirred autoclave and maintained for 4 hours at this temperature. After the suspension had cooled down to 70° C., the pigment was filtered off, washed until salt-free, dried and milled.

The product—in contrast to the coupling product obtained prior to the thermal aftertreatment—displayed on incorporation into a printing ink very great hiding power and very good flowability. In its application properties it was comparable to a pigment aftertreated for 4 hours at 125° C. in 40% strength aqueous isobutanol.

We claim:

1. A process for the production of a pigment product having high hiding power and flowability which comprises heating the crude Pigment Yellow 13 resulting from coupling, in an aqueous suspension in the absence of an organic solvent to a temperature of from 120° to 150° C. under pressure.

2. A process as claimed in claim 1, wherein the aqueous suspension is the coupling suspension obtained after the reaction of bis-diazotized 3,3'-dichlorobenzidine with finely divided 1-acetoacetylamino-2,4-dimethylbenzene.

3. A process as claimed in claim 1, which comprises heating the crude pigment in the presence of a surfactant.

4. A process as claimed in claim 1, wherein the suspension has a pigment content of from 1 to 10% by weight.

5. A process as claimed in claim 1, wherein the time of heating is of from about one-half hour to 5 hours.

6. A pigment product having high hiding power and flowability made by the process which comprises heating crude Pigment Yellow 13, resulting from coupling, in an aqueous suspension in the absence of an organic solvent to a temperature of from 120° to 150° C. under pressure, and isolating said azo pigment product.

7. A pigment product as claimed in claim 6, wherein in said process the suspension has a pigment content of from 1 to 10% by weight.

8. An azo pigment product as claimed in claim 6, wherein in said process the time of heating is of from about one-half hour to 5 hours.

* * * * *